(12) United States Patent
Ryman

(10) Patent No.: US 12,492,769 B2
(45) Date of Patent: Dec. 9, 2025

(54) QUICK CONNECTOR MADE OF PLASTICS

(71) Applicant: Oetiker Schweiz AG, Horgen (CH)

(72) Inventor: Morgan Ryman, Anderstorp (SE)

( * ) Notice: Subject to any disclaimer, the term of this patent is extended or adjusted under 35 U.S.C. 154(b) by 138 days.

(21) Appl. No.: 17/767,489

(22) PCT Filed: Oct. 10, 2019

(86) PCT No.: PCT/EP2019/074318
§ 371 (c)(1),
(2) Date: Apr. 8, 2022

(87) PCT Pub. No.: WO2021/069048
PCT Pub. Date: Apr. 15, 2021

(65) Prior Publication Data
US 2023/0097783 A1  Mar. 30, 2023

(51) Int. Cl.
*F16L 37/088* (2006.01)
*F16L 37/098* (2006.01)

(52) U.S. Cl.
CPC ......... *F16L 37/0985* (2013.01); *F16L 37/088* (2013.01)

(58) Field of Classification Search
CPC ... F16L 37/0985; F16L 37/088; F16L 37/144; F16L 33/22
See application file for complete search history.

(56) References Cited

U.S. PATENT DOCUMENTS

| | | | |
|---|---|---|---|
| 2,521,127 A * | 9/1950 | Price | F16L 37/088 285/302 |
| 4,645,245 A * | 2/1987 | Cunningham | F16L 37/088 285/353 |
| 4,681,350 A | 7/1987 | Gaita | |
| 4,696,495 A | 9/1987 | Oliver | |
| 4,834,423 A | 5/1989 | Deland | |
| 5,193,857 A | 3/1993 | Kitamura | |

(Continued)

FOREIGN PATENT DOCUMENTS

| | | |
|---|---|---|
| CN | 101699122 A | 4/2010 |
| CN | 101825204 A | 9/2010 |

(Continued)

OTHER PUBLICATIONS

International Application No. PCT/EP2019/074318, International Search Report and Written Opinion dated Jun. 29, 2020, 13 pages.

(Continued)

*Primary Examiner* — Zachary T Dragicevich
*Assistant Examiner* — James A Linford
(74) *Attorney, Agent, or Firm* — David L. Nocilly; Bond Schoeneck & King PLLC

(57) ABSTRACT

The present invention provides a quick connector made of plastics material for establishing a snapping connection between a tubular male part (50) and female part (40) of a fluid connection system. The connector has retaining means (10) adapted to be set within the mouth portion (41) of the female part (40) and having first and second flexing members (12, 22) for snapping engagement with the male part (50) and the female part (40), respectively. The first and second flexing members (12, 22) are provided at circumferentially spaced portions of the retaining means (10) so that the overall axial dimensioning of the retaining means (10) is reduced.

(FIG. 1)

12 Claims, 3 Drawing Sheets

(56) References Cited

U.S. PATENT DOCUMENTS

Figure 1A:
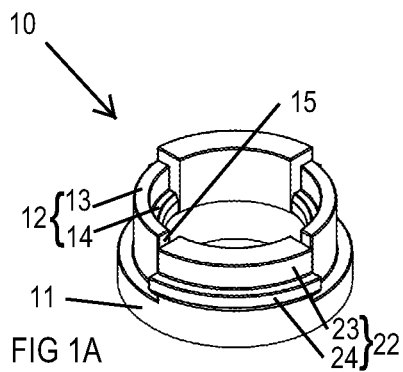

| | | |
|---|---|---|
| 2002/0019177 A1 | 2/2002 | Bartholomew |
| 2008/0048447 A1 | 2/2008 | Yoshino |
| 2008/0090445 A1 | 4/2008 | Luzbetak et al. |
| 2008/0246274 A1 | 10/2008 | Feger et al. |
| 2010/0289259 A1 | 11/2010 | Luzbetak et al. |
| 2021/0221222 A1* | 7/2021 | Steinmann ............ F16L 37/088 |

FOREIGN PATENT DOCUMENTS

| | | | |
|---|---|---|---|
| CN | 102472424 A | 5/2012 | |
| CN | 103925438 A | 7/2014 | |
| EP | 0448790 A1 | 10/1991 | |
| EP | 0806597 A1 | 11/1997 | |
| RU | 2347968 C2 | 2/2009 | |
| WO | WO-03029716 A1 * | 4/2003 | ............ F16L 37/008 |
| WO | 2021069048 A1 | 4/2021 | |

OTHER PUBLICATIONS

Client reported List of cited prior art documents in PCT/EP2019/074318 (WO2021/069048A1), mailed Sep. 18, 2024, entire document.

* cited by examiner

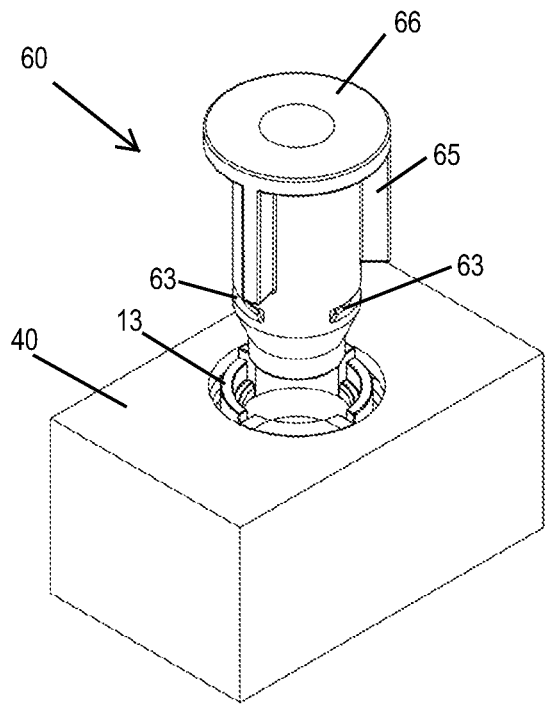
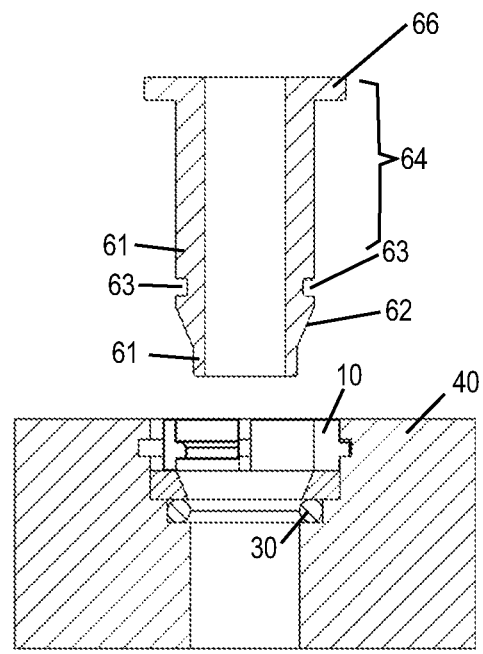
FIG 6A
FIG 6B
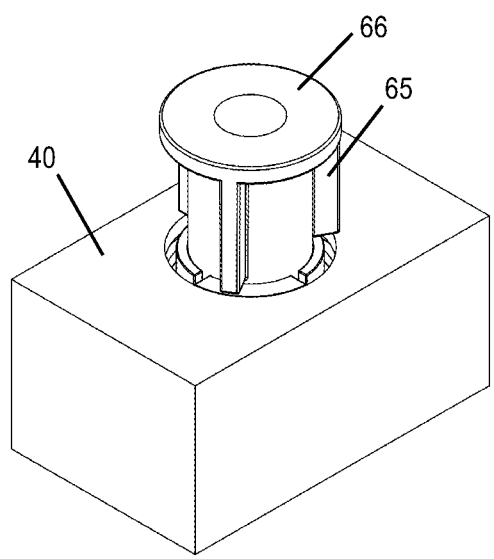
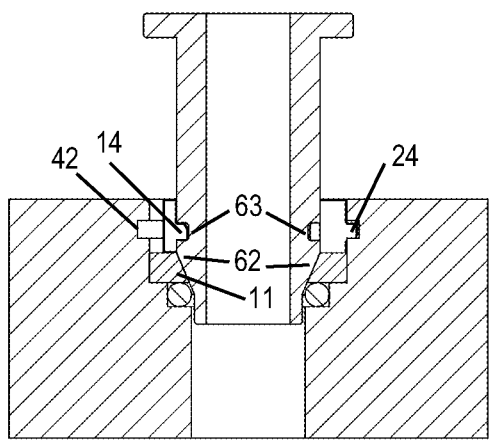
FIG 7A
FIG 7B

QUICK CONNECTOR MADE OF PLASTICS

Quick connectors or snap connectors are widely used for allowing easy connection between a male part, such as a pipe socket, spigot or nipple, and a female part, particularly a hole portion in a block part of a fluid conducting system. Traditionally, such connectors are made of metal. They may have a threaded portion to be screwed into the female part and a sleeve portion which extends from the female part after the threaded portion has been screwed thereinto and which has a resilient member in form of a yoke spring which exerts a spring force in the radial direction for snapping engagement with a recessed portion of the male part.

Disadvantages of the traditional connectors reside in their relatively high weight and production costs since they are predominantly made of metal. Further, they have a quite long axial extension and provide two potential leakage positions. There is a first leakage position at the threaded portion where a first O-ring forms a seal between the connector and the female part and a second leakage position within the inner periphery of the sleeve portion where a second O-ring forms a seal between the connector and the male part.

US 2015/0145240 A1 describes a quick connector in which the threaded part is eliminated, and the connector is not screwed but clinched or staked or swaged in a non-removable fashion to the female part. While this conventional solution eliminates the need of the first O-ring to form a seal between the connector and the female part, it suffers from the disadvantage that the quick connector is permanently connected to the female part. Also, the quick connector still protrudes from the outer surface of the female part when being permanently connected thereto which is undesirable for space saving connector solutions, particularly in fields like battery cooling required in automotive systems for e-mobility.

EP 1 104 530 B1 and EP 1 682 810 B1 disclose conventional quick connectors made of plastics. The connectors have first tongue portions protruding radially inwards for snapping engagement with the male part and second tongue portions protruding radially outwards for snapping engagement with the female part. However, the constructional setup of these conventional connectors is relatively complex and prone to damages since the first and second tongue portions are surrounded by a radial cut out of the material at the connector side wall to which they are connected by a small axial web only. Further, the first and second tongue portions are provided at axially spaced portions of the connector so that the connector has a quite long axial extension and protrudes from the outer surface of the female part.

The object of the present invention is to reduce the weight and cost of the connector, to simplify its constructional setup, to shorten its axial extension and to reduce the number of potential leakage positions.

The object is met by the connector defined in present claim 1. The dependent claims relate to preferred embodiments and additionally call for a connection system comprising the connector and the male and female parts to be connected with each other.

In accordance with the present invention, the quick connector comprises a tubular retaining means which is to be set within the mouth portion of the female part and which comprises first and second flexing members for snapping engagement with both the female part and the male part. Unlike the conventional solutions of quick connectors made of plastics, the present retaining means has the first and second flexing members provided at circumferentially spaced portions. This simplifies the constructional setup of the quick connector and allows to minimise the axial dimension thereof.

According to a preferred embodiment of the present invention, there are plural first flexing members for snapping engagement with the male part and plural second flexing members for snapping engagement with the female part. Axial slits are formed between the alternately arranged first and second flexing members to increase their elastic deformability. Preferably, the retaining means is made of a polymer-based plastics material. It is particularly preferable to form the retaining means as an integral structural body by injecting moulding or the like from mouldable plastics material. Thereby, the production costs and the durability of the connector achieve most competitive values.

In the preferred embodiment, the tubular retaining means has a ring-shaped base portion from which the first and second flexing members protrude in an axial direction with the axial slits in-between. The first flexing member has a first ring segment from which the first tongue portion protrudes radially inwards. Likewise, the second flexing member has a second ring segment from which the second tongue portion protrudes radially outwards. The first and second tongue portion may also have the general shape of a ring segment, and the overall shape of the retaining means may have n-fold symmetry, n being an integer, wherein n=2 in the most preferred embodiment.

The sealing means, preferably an O-ring, an X-seal or a lip seal, is positioned axially frontwards of the retaining means within the mouth portion of the female part. The sealing position does not axially overlap with the retaining means so that the sealing means is able to contact both the male part and the female part when the quick connector is in its locked condition. Thereby, one single sealing position is sufficient for the coupling between the male and female parts so that there is only one single potential leakage position.

The present invention preferably further comprises a plug for holding the retaining means and the sealing means in their condition before final locking attachment of the male part. The retaining means and the sealing means are received at a shaft portion of the plug which has a smaller outer diameter than a gripping portion thereof. The plug serves as a place holder for the male part and is useful in quick and safe handling of the connector during the manufacturing and delivering of the connector, as well as during its later assembling in the fluid connection system, in particular in automobile industry.

The shaft portion preferably has a tapered section for gradually stretching the first flexing member and/or a groove section for receiving the first tongue portion. The second flexing member is adapted to engage with the female part to keep the connector in its locked and sealed state until the plug is to be replaced by the male part. The groove section has a smaller diameter than the circumferentially adjacent portions of the plug and therefore allows the first flexing member to contract due to its elasticity in the radial direction so that it engages with the plug. This state is useful for safe transport or for pressure tests before installation.

In order to release the plug, the plug is turned about its longitudinal axis so that the first flexing member no longer engages with the groove section of the plug. In this state, the plug can be taken out from the connector kept engaged with the female part so that the plug can be replaced by the male part. In summary, the plug allows to close the mouth portion of the female part in a fully sealed condition at a first rotational position and the plug may be released at a second rotational position when the plug is to be replaced by the male part.

When the plug is replaced by the male part of the fluid connection system, preferably a spigot, the first flexing member is again stretched by the male part in a similar way in the radial direction as by the plug to bring the connector in its fully locked state. The female part has a groove formed on the inner periphery of its mouth portion. The groove may have an annular or any other suitable shape. It has a larger inner diameter than the axially adjacent portions of the mouth portion so that the second tongue portion of the second flexing member can lock into the groove when being stretched against its elastic reset force due to the insertion of the male part.

Figure 1B:
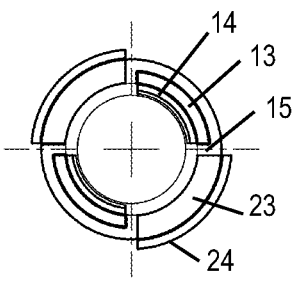
Figure 1C:
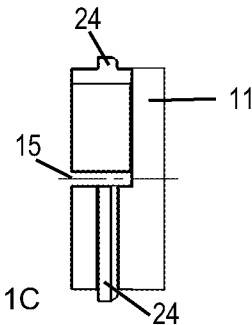
Figure 2A:
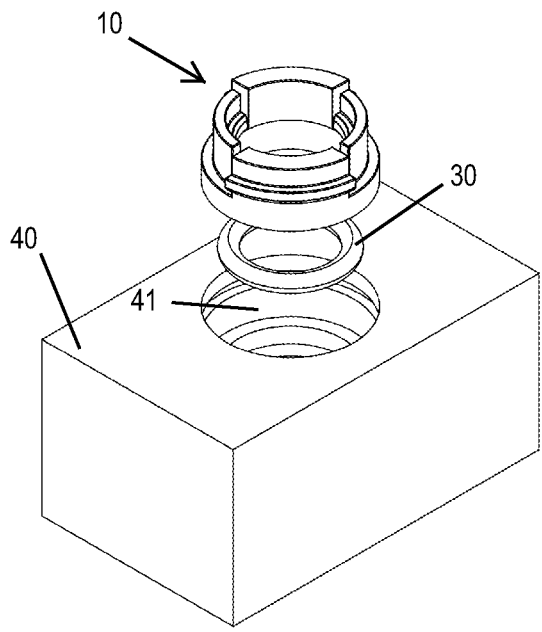
Figure 2B:
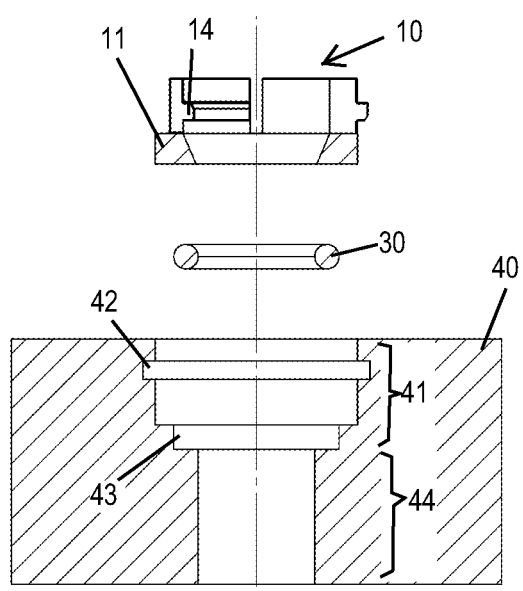
Figure 3A:
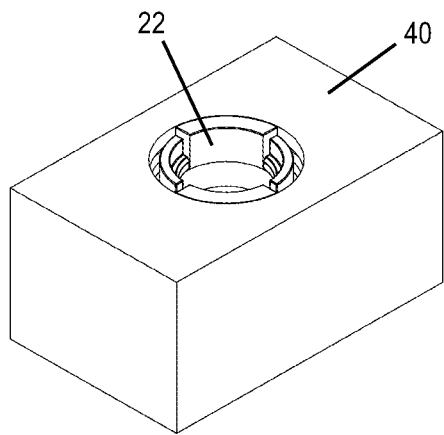
Figure 3B:
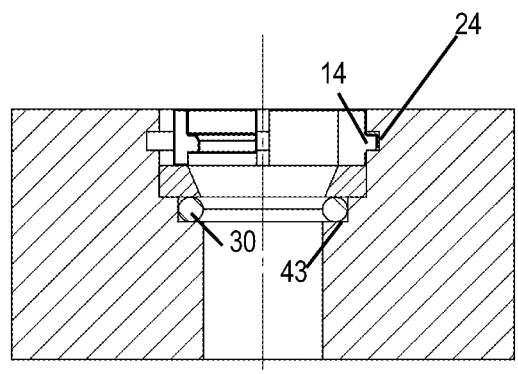
Figure 4A:
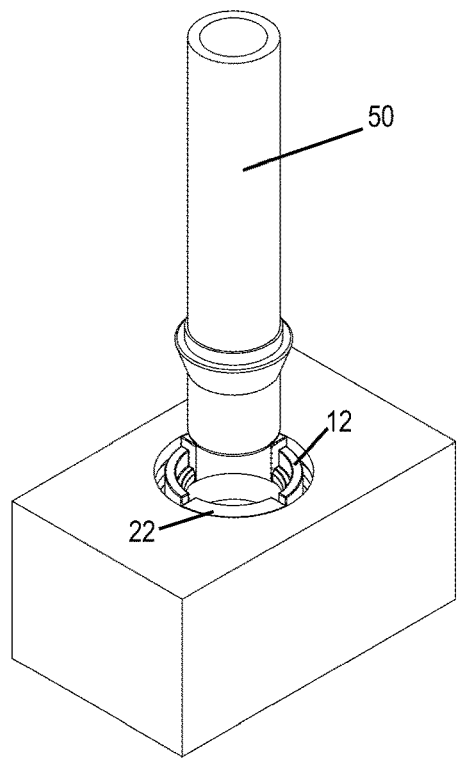
Figure 4B:
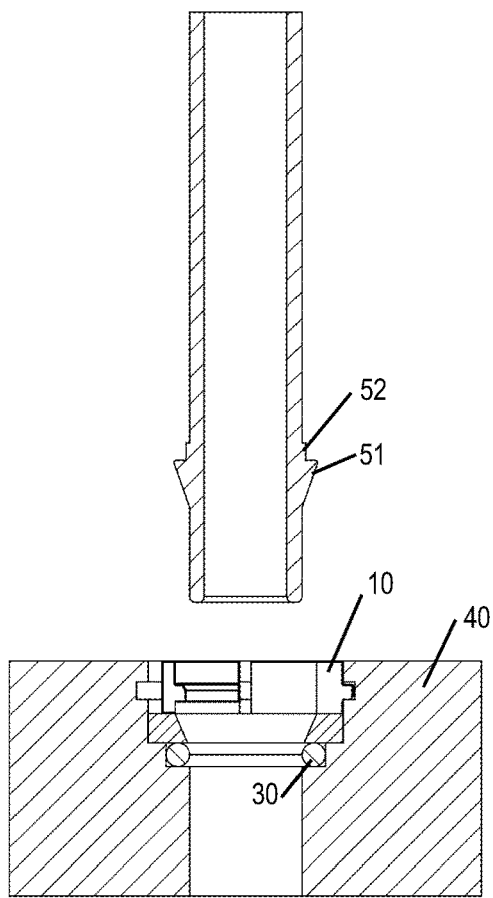
Figure 5A:
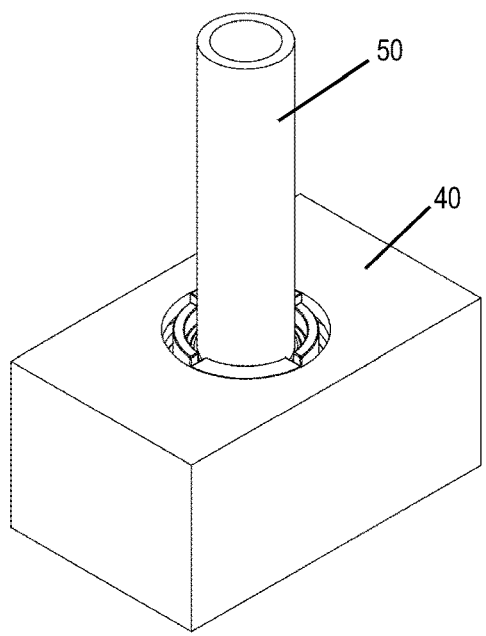
Figure 5B:
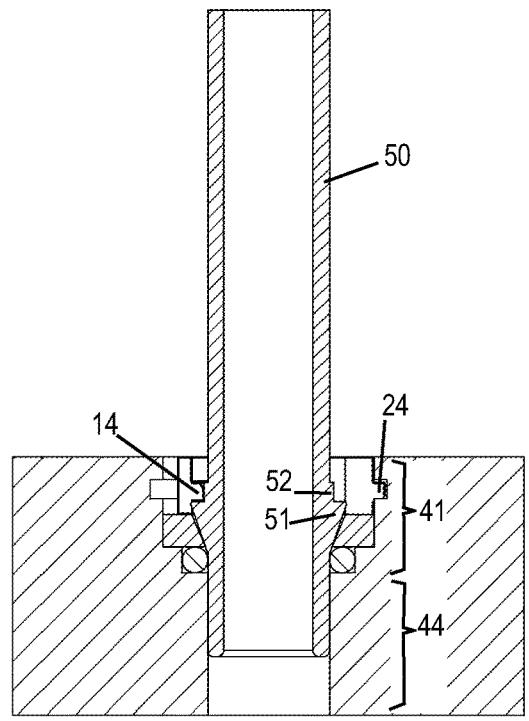

Details of the invention and its embodiments will be explained with reference to the accompanying drawings. Therein shows:

FIG. 1A a perspective view of the tubular retaining means according to an embodiment of the present invention;

FIG. 1B a top view of the retaining means of FIG. 1A;

FIG. 1C a side view of the retaining means of FIG. 1A;

FIG. 2A a perspective exploded view of the quick connector and the female part of the fluid connection system according to the embodiment of the present invention in a non-connected state;

FIG. 2B a cross-sectional view of the fluid connection system components of FIG. 2A;

FIG. 3A a perspective view of the quick connector disposed within the female part of the fluid connection system according to the embodiment of the present invention;

FIG. 3B a cross-sectional view of the fluid connection system components of FIG. 3A;

FIG. 4A a perspective view of the fluid connection system according to the embodiment of the present invention in a non-connected state;

FIG. 4B a cross-sectional view of the fluid connection system of FIG. 4A;

FIG. 5A a perspective view of the fluid connection system according to the embodiment of the present invention in a connected state;

FIG. 5B a cross-sectional view of the fluid connection system of FIG. 5A;

FIG. 6A a perspective view of a plug to be connected with the quick connector disposed within the female part of the fluid connection system according to the embodiment of the present invention;

FIG. 6B a cross-sectional view of the fluid connection system components of FIG. 6A;

FIG. 7A a perspective view of a plug connected with the quick connector disposed within the female part of the fluid connection system according to the embodiment of the present invention; and FIG. 7B a cross-sectional view of the fluid connection system components of FIG. 7A.

FIG. 1A shows the retaining means 10 in a perspective side view. The shown retaining means 10 is made of plastics material, more specifically of a polymer-based plastics material, and is even more specifically obtained as an integral body by injection moulding or the like. The retaining means 10 has a ring-shaped base portion 11 which has a cylindrical outer surface and a tapered, funnel-like inner surface which can best be seen in FIG. 2B below. From the ring-shaped base portion 11, the first and second flexing members 12, 22 protrude in an axial direction. The first and second flexing members 12, 22 are arranged alternately with axial slits 15 provided between each pair of first and second flexing members 12, 22. Due to the slits 15 and the general characteristics of the plastic material, the first and second flexing members 12, 22 have some elastic deformability in the radial direction, i.e. they can be flexibly deformed to a certain extent in a radial direction orthogonal to the axial extension of the tubular retaining means 10.

As shown in greater detail in FIGS. 1B and 1C, each of the two first flexing members 12 has a first ring segment 13 and a first tongue portion protruding from the first ring segment 13 inwardly in a radial direction. The first tongue portion 14 itself has again the shape of a ring segment. Likewise, the two second flexing members 22 each have a second ring segment 23 and a second tongue portion 24 protruding radially outwards from the second ring segment 23. In the shown embodiment with two first and two second flexing members 12, 22, the tubular retaining means 10 has a two-fold rotational symmetry and each of the ring segments substantially has about a quarter ring shape. However, solutions with more than two or even just one of the first and one of the second flexing members are possible and lead to different kinds of a generally n-fold rotational symmetry.

In the perspective exploded view of present FIG. 2A, the retaining means 10 is shown in its pre-assembled state next to a sealing means 30 and in front of the female part 40 formed as a block. For illustration purposes, the retaining means 10 and the sealing means 30 are shown in a pre-assembled position in present FIGS. 2A and 2B. Their assembled position is shown in present FIGS. 3A and 3B. Each of the cross-sectional views in FIGS. 2B-7B is taken along two of the axial slits 15.

In the perspective view of the fluid connection system shown in FIGS. 2A-7A, the female part 40 is formed as a hole in a block. While conventional fluid connection systems provided an inner threading in the hole for screwing a threaded portion of the connector, the mouth portion 41 of the female part 40 is adapted to fully receive and engage with the connector without such threaded portion. The inserting direction of the spigot 50 in FIGS. 4 and 5 extends downwards in the Figure and is hereafter designated as the frontward direction. The opposite direction is designated as the backward direction.

The female part 40 has a mouth portion 41 which has a diameter just large enough to receive the sealing means and the ring-shaped base portion 11 one after another. However, the diameter of the mouth portion 41 is smaller than the outer diameter of the second tongue portion 24 of the second flexing member 22. By pushing the retaining means 10 in the downward direction into the mouth portion 41, the second flexing members 22 will elastically deform radially inwards so that their outer diameter becomes small enough to enter the mouth portion 41. As soon as the second tongue portions 24 will reach the axial position of an annular groove 42 formed axially distant from the outer surface of the mouth portion 41, the second tongue portions 24 will relax into their original state and snappingly engage with the groove 42 of the female part 40.

Thereby, the connection state shown in present FIGS. 3A and 3B is obtained, in which the sealing means 30 and the retaining means 10 reach a locked state and the retaining means 10 is engaged with the female part 40 by the snapping interaction between the second tongue portions 24 and the annular groove 42. As can be seen from present FIGS. 3A and 3B, the retaining means 10 does not protrude axially from the female part 40 but is fully received within its mouth portion 41. This is of particular advantage for processing and delivering the female part 40 with the retaining means 10 in this pre-locked state. Further, the retaining means 10 stops the sealing means 30 from falling out of the mouth part 41 due to its locked axial positioning. The sealing means 30 rests at a step portion 43 of the female part 40. The step 43 has a larger diameter than the axially adjacent portion 44 in the downward direction of the female part 40 so that the sealing means 30 cannot move further inward into the female part 40 either.

An O-ring 30 as the sealing means is to be positioned at an annular step 43 (see FIG. 3B) formed at the frontward end of the mouth portion 41. The O-ring 30 and the other parts of the connector are shown in FIGS. 2A and 2B axially distant from the mouth portion 41, and the spigot 50 as the male part is shown in FIGS. 4A and 4B axially spaced even more backward therefrom. In order to establish the fully connected state of the fluid connection system shown in FIGS. 3 and 5, the sealing means 30 is first positioned within the mouth portion 41 at the step 43 of the female part 40 as shown in FIG. 3, the ring-shaped retaining means 10 and then positioned axially backwards and adjacent to the sealing means 30. The connector already comes into a pre-locked engagement state when being inserted into the mouth portion 41. This is because the second flexing member 22 of the retaining means 10 will undergo some compression when entering the mouth portion 41 and the second tongue portion 24 thereof will then snap into the annular groove 42 of the female part 40. Thereby, the second flexing member 22 prevents the retaining means 10 and the sealing means 30 from falling out of the mouth portion 41 during transport or the like.

Finally, as shown in FIGS. 4 and 5, the male part 50 is pushed through the retaining means 10 and the sealing means 30 until the first tongue portion 14 of the first flexing member 12 which protrudes radially inwards forms a snapping engagement with the male part 50. The tubular male part 50 has a standard outer diameter at its most frontward portion which then gradually increases in a tapered portion 51 arranged for gradually stretching the second flexing member 20 when the male part 50 is pushed through the retaining means 10. Backwards from the tapered portion 51, there is a thickened portion 52 which has an outer diameter large enough to keep the second flexing members 22, more specifically, the two second tongue portions 22 thereof, in its locked state within the annular groove 42. More specifically, the two first flexing members 12 are first stretched by the tapered portion 51 and the two first tongue portions 14 then come to rest on the thickened portion 52 backwards of the tapered portion 51. The ratchet formed at the backward end of the tapered portion 51 abuts against the first tongue portion 14 of the first flexing member 12 so that the male part 50 remains locked within in the connector and cannot be moved backwards anymore.

FIG. 5 shows the fluid connection system in its locked state. As described previously, the female part 40 is formed as a hole in a block. The hole has a standard diameter portion 44 which is slightly larger than the outer diameter of the frontward portion of the male part 50. Backwards from the standard diameter portion 44, there is the mouth portion 41 having a larger inner diameter than the standard diameter portion 44. The mouth portion 41 has the step 43 for receiving the sealing means 30 and a portion with a larger diameter than that of the step 43 in which the retaining means 10 is to be received such that it is not protruding axially outwards from the female part 40. The mouth portion 41 further has an annular groove 42 with a larger diameter than the adjacent backward part of the mouth portion 41 so that the two second flexing members 22 can protrude into the annular groove 42 when being brought by the tubular male part 50 into their locked state.

As can be seen by a comparison of the sealing means in the cross-sectional views of FIGS. 4B and 5B, the sealing means 30 is expanded when the male part 50 is pushed through the retaining means 10 and the sealing means 30 into the fully locked position shown in present FIGS. 5A and 5B. Thereby, the fluid connection system reaches a state in which the male part 50 is fully sealed against the female part 40. This is due to the fact that the most frontward portion of the male part 50 has an outer diameter which is slightly larger than the inner diameter of the sealing means 30 so that the sealing means 30 has to radially expand when the male part 50 is pushed through with its most frontward portion.

Before insertion of the male part 50, the connector is often held in a pre-locked state by a plug 60. As can be seen best in the cross-sectional view of FIG. 6, the shaft portion 61 of the plug 60 has a standard outer diameter coinciding with that of the male part 50 for which it serves as a place holder. Also, the tapered section 62 substantially corresponds to the tapered portion 51 of the male part 50 and serves for stretching the second flexing member 20 when the plug 60 is pushed through the retaining means 10 and the sealing means 30.

The plug 60 further has stopping ridges 65 extending in the axial direction and providing the plug 60 with an enlarged outer diameter for stopping abutment against the retaining means 10 when the plug 60 is in its fully inserted position. A gripping portion 64 of the plug 60 comprises the three stopping ridges 65 and a disk portion 66. The stopping ridges 65 allow easy rotation of the plug 60 by a user's hand and sufficiently enlarge the diameter of the plug to prevent it from being pushed too far into the connector. They further may indicate to the user at which circumferential portions of the plug 60 the two groove sections 63 are formed and they extend up to a disk portion 66 forming the terminal edge of the plug 60 at the most backward portion.

FIGS. 6 and 7 show the plug 60 in a first rotational position in which the groove sections 63 snappingly engage with the first tongue portions 14 of the retaining means 10. In this first rotational position, the plug 60 is in an axially locked position and closes the mouth portion 41 so that no dirt can enter. Due to the expansion of the sealing means 30, achieved by pushing the plug 60 through the retaining means 10 and the sealing means 30 into the fully locked position shown in present FIG. 7A and 7B, the plug also realizes a fully sealed state in which no liquid or other fluids can enter or exit the mouth portion 41. This is due to the fact that the most frontward portion of the plug 60 has an outer diameter which is slightly larger than the inner diameter of the sealing means 30 so that the sealing means 30 has to radially expand when the plug 60 is pushed through with its most frontward portion. The sealing capability of the connector in a pre-assembled state achieved by the plug 60 is of most advantage during various processing and testing steps, particularly in car industry relating to the fluid cooling of electric driving systems.

The plug can be rotated about its longitudinal axis from the shown first rotational state into a second rotational state. In the shown embodiment, this rotation is achieved by turning the plug 60 by 90 degrees in the clockwise or counter-clockwise direction. In this second rotational state, the groove sections 63 will circumferentially move out of the snapping engagement with the first tongue portions 14 so that the plug 60 gets from its locked state into its released state. Even though the plug 60 is still in sealing engagement with the sealing means 30 with its most frontward portion, it is no longer locked in its axial direction so that it can be pulled backwards out of the mouth portion 41 of the female part. This is normally the time when the plug 60 is to be replaced by the male part 50 shown in FIGS. 4 to 5 and explained in reference to those Figures further above.

In summary, the present invention provides a quick connector made of plastics material for establishing a snapping connection between a tubular male part 50 and female part 40 of a fluid connection system. The connector has retaining means 10 adapted to be set within the mouth portion 41 of the female part 40 and having first and second flexing members 12, 22 for snapping engagement with the male part 50 and the female part 40, respectively. The first and second flexing members 12, 22 are provided at circumferentially spaced portions of the retaining means 10 so that the overall axial dimensioning of the retaining means 10 is reduced.

LIST OF REFERENCE SIGNS

10 retaining means
11 ring-shaped base portion
12 first flexing member
13 first ring segment
14 first tongue portion
15 slits
22 second flexing member
23 second ring segment
24 second tongue portion
30 sealing means
40 female part
41 mouth portion
42 annular groove
43 step
44 axially adjacent portion
50 tubular male part
51 tapered portion
52 thickened portion
60 plug
61 shaft portion
62 tapered section
63 groove section
64 gripping portion
65 stopping ridges
66 disc portion

The invention claimed is:

1. A quick connector, comprising:
a male part (50);
a female part (40);
a seal (30) set within a mouth portion (41) of the female part (40) and connecting the female part (40) to the male part (50) while forming a seal between the male part (50) and the female part (40); and
a tubular retainer (10) set within the mouth portion (41) and having at least one first flexing member (12) with a first tongue portion (14) protruding radially inwards and snap engaged with the male part (50) and at least one second flexing member (22) with a second tongue portion (24) protruding radially outwards and snap engaged with the female part (50), wherein the tubular retainer (10) has a ring-shaped base portion (11) from which the first and second flexing members (12, 22) protrude in an axial direction;
wherein the first and second flexing members (12, 22) are provided at circumferentially spaced portions of the retainer (10);
wherein a series of axial slits (15) are formed between the first and second flexing members (12, 22) so that the first and second flexing members (12, 22) can be flexibly deformed in a radial direction orthogonal to the axial extension of the retainer (10);
wherein the first flexing member (12) has a first ring segment (13) axially protruding from the ring-shaped base portion (11) of the retainer (10); and
wherein the first tongue portion (14) protrudes from the first ring segment (13) inwards in said radial direction orthogonal to the axial extension of the retainer (10).

2. The quick connector of claim 1, wherein the retainer (10) is made of plastics material and formed as an integral structural body.

3. The quick connector of claim 1, wherein the retainer (10) comprises at least two first and at least two second flexing members (12, 22), and the first flexing members (12) are arranged alternately with the second flexing members (22) in the circumferential direction of the retainer (10).

4. The quick connector of claim 1, wherein the second flexing member (22) has a second ring segment (23) axially protruding from the ring-shaped base portion (11) of the retainer (10), and the second tongue portion (24) protrudes radially outwards from the second ring segment (23).

5. The quick connector of claim 1, wherein the first and second tongue portions (14, 24) have the shape of a ring segment.

6. The quick connector of claim 1, wherein the retaining means (10) is adapted to retain the seal (30) in a sealing position axially next to but not overlapping the retainer (10) so that the seal (30) is adapted to contact both the male part (50) and the female part (40) in a locked condition of the quick connector.

7. The quick connector of claim 1, further comprising a plug (60) for holding the retainer (10) and the seal (30) in a non-installed condition of the connector, wherein the plug (60) has:
a shaft portion (61) adapted to extend through the retainer (10) and the sealing means (30); and
a gripping portion (64) having a larger outer diameter than the retainer (10) so that it protrudes axially outwards therefrom to be gripped by a user.

8. The quick connector of claim 7, wherein the shaft portion (61) has:
a tapered section (62) with gradually increasing outer diameter adapted to deflect the first flexing member (12) outwards when the tapered section (62) is inserted into the retainer (10); and
a groove section (63) for engaging with the first tongue portion (14) when the plug (60) is fully inserted into the retainer (10) and the plug (60) is oriented in a first rotational position relative to the retainer (10), while sections of the shaft portion (61) which are circumferentially adjacent to said groove section (63) have no grooves so that the plug (60) does not engage with the retainer (10) in a second rotational position relative to the retainer (10) in which free axial movement of the plug (60) with respect to the retainer (10) is possible.

9. A fluid connection system comprising:
the quick connector of claim 1;
wherein the tubular male part (50) is a spigot; and
the female part (40) is formed as a hole in a connector block.

10. The system of claim 9, wherein the tubular male part (50) has:
a tapered portion (51) in which the outer diameter gradually increases in order to deflect the first flexing member (12) radially outwards when the tapered portion (51) is inserted into the retainer (10); and a thickened portion (52) which is adapted to engage with the first tongue portion (14) when the male part (50) is in its engagement position with the retainer (10).

11. The system of claim 9, wherein the female part (40) has an annular groove (42) formed on the periphery of its mouth portion (41), and the second tongue portion (24) is adapted to protrude into the annular groove (42) when the female part (40) is in its engagement position with the retainer (10).

12. The system of claim 9, wherein the mouth portion (41) has a larger inner diameter than the axially adjacent portion (44) of the female part (40), and the mouth portion (41) has a step (43) for receiving the sealing means (30).

* * * * *